G. E. MATTS.
FISHING REEL.
APPLICATION FILED MAR. 30, 1908.

No. 900,563.

Patented Oct. 6, 1908.

2 SHEETS—SHEET 1.

Witnesses
L. Lee
J. W. Greenbaum

Inventor
George E. Matts, per
Thomas S. Crane, atty.

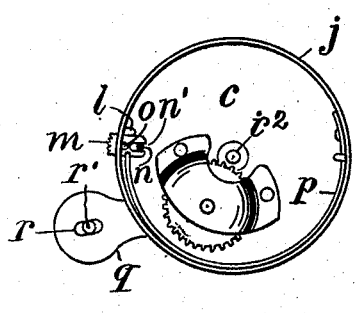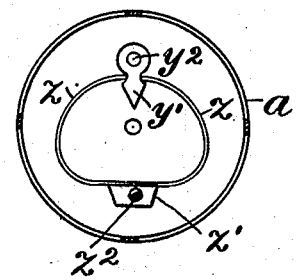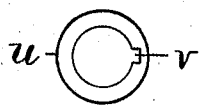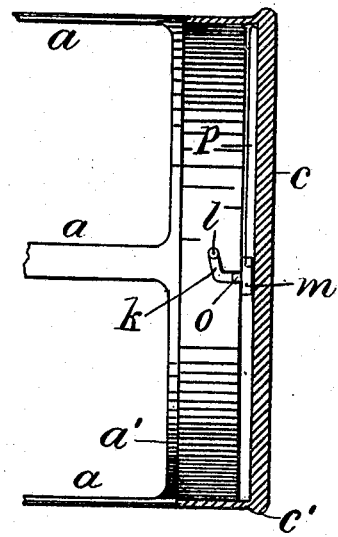

UNITED STATES PATENT OFFICE.

GEORGE EDWARD MATTS, OF NEWARK, NEW JERSEY.

FISHING-REEL.

No. 900,563.  Specification of Letters Patent.  Patented Oct. 6, 1908.

Application filed March 30, 1908. Serial No. 424,100.

*To all whom it may concern:*

Be it known that I, GEORGE E. MATTS, a citizen of the United States, residing at 599 Fifteenth avenue, Newark, county of Essex, and State of New Jersey, have invented certain new and useful Improvements in Fishing-Reels, fully described and represented in the following specification and the accompanying drawings, forming a part of the same.

The present invention relates to a reel having a cage to contain the spool with heads upon the ends of the cage to support the pivots of the spool-spindle, and having gearing with a crank-shaft upon one of the heads to rotate the spool.

Figure 1:
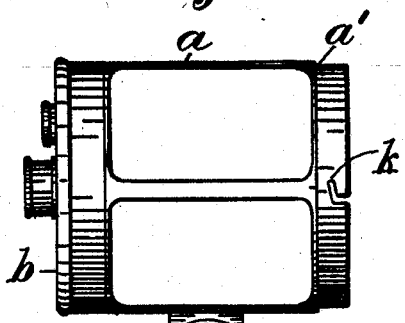
Figure 2:
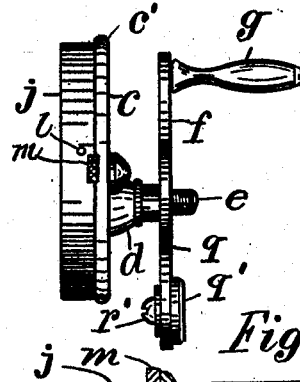
Figure 3:
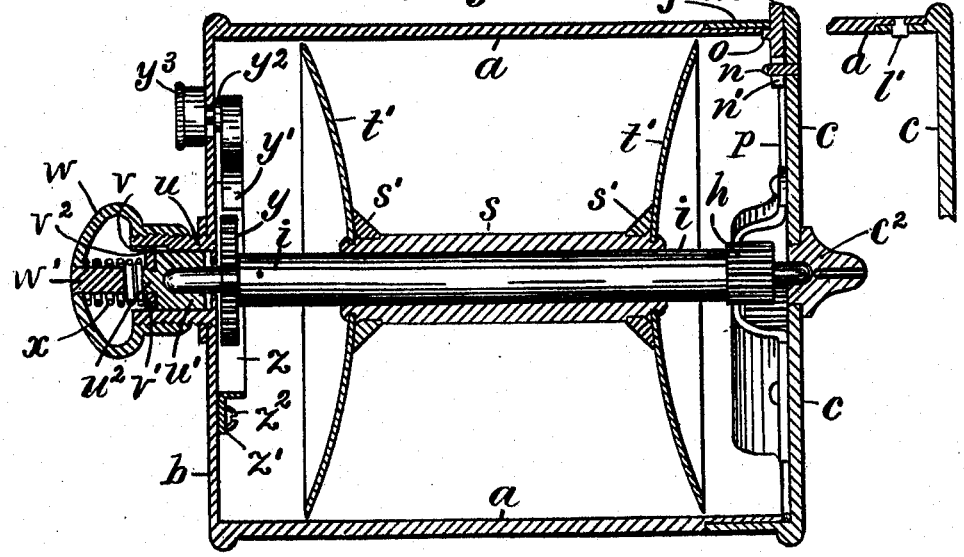
Figure 4:
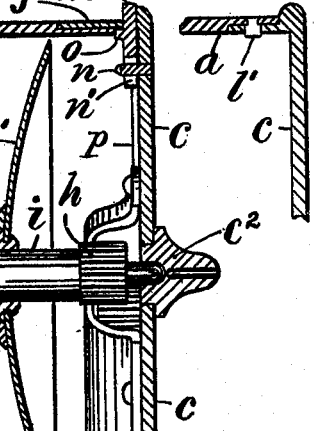

The improvements consist in the combination and arrangement of parts hereinafter set forth and described, and which will be understood by reference to the annexed drawing, in which Figure 1 is a side view of the reel with the crank-head detached; Fig. 2 is a side view of the crank-head; Fig. 3 is a longitudinal section of the reel greatly enlarged; Fig. 4 shows an alternative construction for the flange on the head; Fig. 5 is an end view of the crank-head upon the inner side; Fig. 6 is a similar view of the opposite head; Fig. 7 is an end view of the hub on the click-carrying head; Fig. 8 shows a plan of the key-plate for the movable spring-bearing; and Fig. 9 shows the end of the reel-cage, as represented in Fig. 1, with the latch-block adjacent to the bayonet slot and a section of the head $c$ outside of the same, such section taken just inside the flange $j$.

$a$ designates a cage formed of tubing with openings for the play of the fishline; $b$ designates the head containing the click-pawl and carrying the spring-bearing; $c$ designates the crank-head having the crank-bearing $d$ thereon with crank-shaft $e$ therein, upon the outer end of which the crank-arm $f$ is secured and provided with handle $g$.

The inner end of the crank-shaft is connected by the usual gear-wheels $h$ with the spindle $i$ of the spool. The spindle has journals upon its opposite ends, one of which has a fixed bearing $c^2$ in the head $c$, which bearing is closed at the outer end to form a step and resist any end movement of the spindle. The head $c$ is shown with a cylindrical flange $j$, and the adjacent end of the cage $a$ is rabbeted to receive such flange flush with its outer surface. The flange is made slightly wider than the rabbeted portion of the cage, as shown in Figs. 3 and 9, and is secured upon rabbeted end of the cage by a bayonet-lock consisting of two bent slots $k$ and pins $l$. The open end of the slot $k$ forms a notch to engage a catch-pin upon the removable head $c$ for locking the head to the cage. Such a notch is claimed herein in combination with a latch-block and a catch-pin which will be hereinafter described.

In Figs. 1, 2 and 3, the slots are formed upon the cage and the pins upon the cylindrical flange; but in Fig. 4, an alternative construction is shown, in which the flange fits inside of the cage and is provided with the bayonet-slots, the pins $l'$ being projected from the inner side of the cage near its end to engage such slots. The slots are slightly inclined from the end of the cage as shown in Fig. 1 so as to press the pins inwardly and draw the head close upon the cage.

The head is provided with a knurled collar $c'$ upon its outer corner to turn it in engaging the bayonet-lock, and the sloping of the bayonet-slot operates to draw the end of the cylindrical flange shown in Figs. 2 and 9, close to the end of the rabbet $a'$ shown in Fig. 1, or to draw the knurled collar close against the end of the cage in the construction shown in Fig. 4.

Two of the bayonet-locks are shown in Fig. 5, but not set opposite to one another, which thus enables the user to always secure the head upon the cage in the same position.

To prevent the head $c$ being turned accidentally and thus loosening the bayonet-locks, a sliding latch-block $m$ is fitted through a slot in the flange $j$ and lies upon the inner side of the head $c$. The latch-block lies adjacent to one of the pins $l$, as shown in Figs. 5 and 9, and the slot through which the latch-block plays is formed flush with the inner side of the head $c$ so that the latch-block may slide upon the head. The tail of the latch-block is provided with a slot $n'$, and a screw $n$ is fitted through the same into the head $c$ to hold the latch-block movably in the slot of the flange $j$. A leaf-spring $p$ bent into semi-circular form is inserted inside the flange $j$ and one end engaged with the latch-block while the other end presses against the flange at the opposite side of the head. The spring is thus held in place by its own resiliency and operates to press the latch-block outward. The latch-block by this construction lies in contact with the outer end of the cage, as shown in Fig. 9, when the bayonet locks are engaged, and a catch-pin $o$ is projected laterally from the latch-block toward the end of the cage to engage the open end of the bayonet slot $k$. When the catch-pin is thus engaged, its contact with the inner side of the flange $j$ determines its projection from the flange $j$ or above the collar $c'$. The catch-pin is thus arranged to engage one end of the bayonet-slot when its engaging pin $l$ has been moved to the inner end of the slot, the engagement of the catch-pin at the outer end of the slot then preventing the head $c$ from being turned to release the same. By pressing upon the outer end of the latch-block in opposition to the spring $p$, the catch-pin $o$ is forced in from the end of the bayonet-slot and the head can be rotated and detached.

In applying the head to the cage, the latch-block is pressed inwardly by the finger and the catch-pin $o$ thus pressed within the cage until the bayonet locks are engaged. When the pins $l$ are fully turned into the bayonet slots $k$ the catch-pin $o$ springs automatically into the open end of the adjacent bayonet slot. The projection of the latch-block above the surface of the flange $j$ or collar $c'$ enables the fisherman to readily find the same and exert the necessary pressure to detach the catch-pin from the slot $k$ when he desires to remove the reel-head. The construction is strong and durable and is not liable to be obstructed in its operation by dirt or grit which may reach the outside of the reel. A counterbalance arm $q$ is commonly extended from the crank-arm $f$ and has a counterbalance weight secured thereto which is proportioned, as nearly as possible, to balance the crank-arm and handle; but in practice, it is found difficult to secure an exact balance, as the weight has to be actually altered in its bulk to modify its effect. An unequal movement of the crank is thus often occasioned in a fishing reel; and to avoid this difficulty in the manufacture and use of fishing reels, I provide a means of varying the effect of the same counterbalance weight by forming a slot $r$ in the counterbalance arm and securing a weight $q'$ adjustably upon such arm by a screw $r'$ inserted through the slot, which permits the weight to be moved inward and outward upon the arm until an exact balance is secured. Such movement is, in practice, effected by striking the weight lightly to shift it to the required position and then securing it firmly by tightening the screw. This device is cheap but very efficient and secures the most perfect operation of the reel.

The spool is formed with a sleeve $s$ secured upon a spindle $i$ and shouldered down at the ends to receive hubs $s'$, which are firmly held upon the hub by upsetting or riveting the projecting ends of the sleeve upon the outer sides of such hubs, leaving such ends projecting sufficiently to be trued again in a lathe and the centers of the spool-flanges $t'$ fitted upon them.

The inner sides of the flanges are fitted snugly to the faces of the hubs and to the ends of the sleeve and soldered thereon, and the ends of the sleeve are finally riveted over the outer sides of the flanges to reinforce the soldered connection. The spool is thus formed of five pieces, the sleeve, the two hubs and the two flanges, which are all secured together most firmly.

A drag for the spool has sometimes been furnished by using a screw to press one of the spindle bearings against the end of the spindle, but a very slight pressure greatly varies the friction upon the spindle and the proper adjustment of such a screw is therefore difficult. To avoid such objectional use of a screw, I furnish one of the end bearings with a spring which operates, when adjusted, to press the bearing elastically upon the end of the spindle, and which spring is adjusted by a screw-cap and operates normally to hold the spindle from rattling, or so-called "whistling", by end movement.

The construction will be understood by reference to Figs. 3, 7 and 8, in which $u$ is a hub secured upon the head $b$ and having a cylindrical socket with a smooth cylindrical step-block $u'$ fitted snugly to slide therein and receiving the journal at the end of the spindle $i$. A keyway $v$ is formed inside the socket and a tongue or projection is provided upon the step-block to fit such keyway and hold the step-block from rotation. Such tongue is conveniently formed by providing a stud $u^2$ upon the outer end of the step-block, and riveting thereon a plate $v'$ formed with tongue $v^2$ to engage the keyway. The exterior of the hub is threaded, and a screw-cap $w$ is threaded internally to turn upon the same and provided inside with a central stud $w'$ upon which a spiral spring $x$ is fitted to operate upon the step-block by contact with the plate $v'$. The spring is so proportioned that its pressure upon the step block can be wholly removed by partly unscrewing the cap $w$, and can be brought into action upon the step-block and the pressure gradually increased by screwing up the cap. The spring produces an elastic pressure of the step-block $u'$ upon the pivot of the spindle $t$ which is wholly different from the rigid pressure of an adjusting screw, and the adjustment and varying of such elastic pressure can thus be effected by turning the cap and the most delicate restraint exerted upon the end movement of the spool without producing any appreciable friction.

When a drag upon the spool is desired, the cap can be turned to increase the friction to the desired degree.

It will be seen from the above description that the step-block is, in practice, operated with a constant elastic pressure upon the end of the journal and that such pressure is readily varied by turning the cap $w$ to produce the various effects desired; the step block being held from rotation, which is necessary to form a suitable bearing for the spindle. Such constant elastic pressure of the step-block necessitates an abutment opposed to such pressure at the opposite end of the spindle, and such abutment is formed by the bearing $c^2$ which is constructed to fit the end of the spindle and is thus adapted to resist the end thrust of the spring-step-block $u'$.

A click-wheel $y$ is shown upon the end of the spool within the head $b$ and the usual click $y'$ pivoted upon a radially sliding stud $y^2$ having a knob $y^3$ upon the outer end, as is common, to move the click into and out of engagement with the click-wheel.

A wire spring has commonly been used, bent into circular form and secured within the head $b$ with its opposite ends in contact with the opposite sides of the click; but a round wire is as capable of yielding in one direction as another, and does not therefore remain in contact with the side of the click; and it is therefore not unusual for such a wire spring to slip outward from the head and over the outer side of the click, instead of maintaining its pressure upon the opposite edges of the click, as required.

I have devised an improved click-spring formed of a double armed flat leaf-spring $z$ bent into circular form, with the ends of the leaf-arms applied to the opposite sides of the click, and having an integral foot $z'$ bent at right angles to the leaf opposite to the ends of its arms and secured to the inner side of the reel-head by a screw $z^2$ and operating to hold the front leaf edgewise or transverse to the head so that the arms maintain their position next to the head, but yield readily to the pressure of the click. The click-spring is thus effectively held from displacement without losing any of its flexibility and freedom to yield. In fact, the spring-leaf is widest transversely to the head, which enables it to strongly resist any movement outward from the head which could allow it to slip over the front of the click into an inoperative position, and is thinnest in the direction in which it is pushed by the click so that it yields freely to the movements of the click. The leaf-spring is thus peculiarly adapted to resist any displacement edgewise which could disengage it from the edges of the click.

The latch-block which I employ to lock the removable head upon the cage of the reel is, in practice, very durable and efficient and far more satisfactory than a spring-pin projected through the flange of the head into a perforation through the cage, and the spring step-block which I provide for one end of the spindle furnishes a support for the journal which is wholly free from lost motion, and which can be instantaneously converted into a drag when desired.

Having thus set forth the nature of the invention what is claimed herein is:

1. In a reel, the combination, with a cage having a spool therein and a notch upon the extreme end of the cage, of a flat head $c$ having a cylindrical flange $j$ fitted to the end of the cage adjacent said notch, and a slot through the flange flush with the inner flat side of the head, means to engage the flange and cage, a radially moving latch-block $m$ fitted through the slot in the flange and held movably upon the inner flat side of the head, a catch-pin $o$ projected from the side of the block to engage the notch in the end of the cage and limit the outward movement of the latch-block, and a spring operating upon the latch-block to press the same normally outward.

2. In a reel, the combination, with the tubular cage $a$ having a spool therein and provided with the bayonet slots $k$ opening upon the end of the cage, of a flat head $c$ having a cylindrical flange $j$ fitted to the end of the cage and provided with the pins $l$ to engage such bayonet slots, the head having a slot through the flange adjacent one of the pins $l$ and flush with the inner flat side of the head, the latch-block $m$ fitted through the said slot and having the slot $n'$ in its tail with the screw $n$ fitted through the same into the head to hold the latch-block movably, the catch-pin $o$ projected from the latch-block in a suitable position to engage the outer end of the bayonet slot when engaged by the adjacent pin $l$, and the curved wire-spring $p$ inserted within the flange and extended around the same to hold itself in place, and one end engaged with the latch-block to press the same normally outward to engage the pin $o$ with the outer end of the bayonet slot, the outer end of the latch-block projecting above the flange $j$ when the pin is thus engaged, so that the latch-block may be pressed inwardly to remove the pin from the bayonet slot.

3. In a fishing reel, the combination, with a cage, and a spool having a spindle with journals at the ends, of the head $c$ at one end of the cage having the end bearing $c^2$ for one of the journals, the head $b$ at the opposite end of the cage having a hub $u$ with a socket therein, and the means for pressing the spindle elastically toward the end bearing $c^2$ consisting of the step-block $u'$ fitted to slide in the socket without rotation and fitted also to the journal upon the spindle, means for pressing the step-block elastically toward the end of the journal, and means for readily varying such elastic pressure.

4. In a fishing reel, the combination, with a cage, and a spool having a spindle with journals at the ends, of the head $c$ at one end of the cage having the end bearing $c^2$ for one of the journals, the head $b$ at the opposite end of the cage having a hub $u$ threaded externally and having a smooth cylindrical socket therein with keyway $v$ at one side, the smooth cylindrical step-block $u'$ fitted to said socket and journal and having tongue $v^2$ to engage the keyway, and the cap $w$ fitted to turn upon the threaded hub and having the central stud $w'$ with spiral spring fitted thereon and pressed upon the end of the step-block by a suitable adjustment of the cap and thereby enabled to prevent lost motion or form a drag upon the spool, such elastic pressure being resisted by the end bearing $c^2$.

5. In a fishing reel, the combination, with a cage, and a spool having a spindle with journals at the ends, of the head $c$ at one end of the cage having the end bearing $c^2$ for one of the journals, the head $b$ at the opposite end of the cage having a hub $u$ threaded externally and having a smooth cylindrical socket therein with keyway $v$ at one side, the smooth cylindrical step-block $u'$ fitted to said socket and journal and provided with the stud $u^2$ upon its outer end, the plate $v'$ secured upon the stud $u'$ and formed with tongue $v^2$ to engage the keyway, the hub having an adjustable cap $w$ thereon with spring pressed by the same against the plate $v'$ to vary the pressure of the step-block upon the journal, such pressure being resisted by the end bearing $c'$.

6. In a fishing reel, the combination, with a head having a crank-shaft with bearing to rotate the spool, and a crank-arm $f$ upon the outer end of the crank-shaft with handle to rotate the same, of a counterbalance arm $q$ extended from the crank-arm and provided near the outer end with the radial slot $r$, and a counterbalance weight $q'$ fitted upon the flat side of such counterbalance arm, with screw $r'$ inserted through the slot securing the weight adjustably upon the arm.

In testimony whereof I have hereunto set my hand in the presence of two subscribing witnesses.

GEORGE EDWARD MATTS.

Witnesses:
    GEORGE A. RAYNOR,
    ALTA MOYER TAYLOR.